(12) United States Patent
Lau et al.

(10) Patent No.: US 11,763,698 B2
(45) Date of Patent: Sep. 19, 2023

(54) METALLIZED BREATHABLE COMPOSITE FABRIC

(71) Applicant: LifeLabs Design, Inc., Sunnyvale, CA (US)

(72) Inventors: Cindy Yee Cin Lau, Palo Alto, CA (US); Pei Zhu, Santa Clara, CA (US)

(73) Assignee: LifeLabs Design, Inc., Sunnyvale, CA (US)

( * ) Notice: Subject to any disclaimer, the term of this patent is extended or adjusted under 35 U.S.C. 154(b) by 140 days.

(21) Appl. No.: 17/239,218

(22) Filed: Apr. 23, 2021

(65) Prior Publication Data

US 2021/0237410 A1    Aug. 5, 2021

Related U.S. Application Data

(63) Continuation-in-part of application No. PCT/US2020/061762, filed on Nov. 23, 2020, and a continuation-in-part of application No. 16/941,418, filed on Jul. 28, 2020.

(60) Provisional application No. 62/941,555, filed on Nov. 27, 2019, provisional application No. 62/879,872, filed on Jul. 29, 2019.

(51) Int. Cl.
| | | |
|---|---|---|
| *B32B 5/02* | (2006.01) | |
| *G09B 19/06* | (2006.01) | |
| *G06T 7/11* | (2017.01) | |
| *B32B 7/12* | (2006.01) | |
| *B32B 27/12* | (2006.01) | |
| *B32B 27/18* | (2006.01) | |
| *B32B 27/40* | (2006.01) | |
| *G06F 3/0482* | (2013.01) | |
| *G09B 19/08* | (2006.01) | |

(52) U.S. Cl.
CPC ............... *G09B 19/06* (2013.01); *B32B 5/02* (2013.01); *B32B 7/12* (2013.01); *B32B 27/12* (2013.01); *B32B 27/18* (2013.01); *B32B 27/40* (2013.01); *G06F 3/0482* (2013.01); *G06T 7/11* (2017.01); *B32B 2264/105* (2013.01); *B32B 2264/30* (2020.08); *B32B 2305/18* (2013.01); *B32B 2307/724* (2013.01); *B32B 2437/00* (2013.01); *G06T 2200/24* (2013.01); *G09B 19/08* (2013.01)

(58) Field of Classification Search
CPC . B82Y 30/00; B82Y 40/00; B22F 1/00; B22F 1/05; B22F 1/054; B22F 1/0545; B32B 37/0076; B32B 37/0084; B32B 5/02; B32B 7/12; B32B 27/12; B32B 27/18; B32B 27/40; B32B 2264/105; B32B 2305/18; B32B 2307/724; B32B 2437/00
USPC ............... 977/778, 779, 783, 785; 428/402; 442/276
See application file for complete search history.

(56) References Cited

U.S. PATENT DOCUMENTS

| | | |
|---|---|---|
| 4,999,222 A | 3/1991 | Jones et al. |
| 2005/0014432 A1 | 1/2005 | Jain et al. |
| 2006/0099431 A1* | 5/2006 | Scholz ............... G02B 5/085 |
| | | 428/480 |
| 2008/0108263 A1 | 5/2008 | Conley et al. |

(Continued)

*Primary Examiner* — Matthew D Matzek

(57) ABSTRACT

A composite fabric includes a lining layer and a metallized membrane. The metallized membrane includes a polymer layer having polyurethane and nano/micro metal particles embedded in the polymer layer. The nano/micro metal particles are about 10-50 wt % inclusive of the metallized membrane. The lining layer is connected to the metallized membrane via point contacts.

20 Claims, 3 Drawing Sheets

(56) References Cited

U.S. PATENT DOCUMENTS

2013/0212789 A1\* 8/2013 Conolly ................. B32B 5/024
                                                    428/221
2014/0227552 A1   8/2014 Lau et al.

\* cited by examiner

METALLIZED BREATHABLE COMPOSITE FABRIC

CROSS REFERENCE TO RELATED APPLICATIONS

This application is a continuation-in-part of U.S. patent application Ser. No. 16/941,418 filed Jul. 28, 2020, which claims benefit of U.S. provisional application No. 62/879,872 filed Jul. 29, 2019, and is a continuation-in-part of international patent application no. PCT/US2020/61762 filed Nov. 23, 2020, which claims benefit of U.S. provisional application No. 62/941,555, filed Nov. 27, 2019. The content of all of the above applications is incorporated herein by their entirety.

TECHNICAL FIELD

This disclosure is generally related to fabric for apparels, footwears, tents, and sleeping bags, and more specifically to metallized breathable composite fabrics for apparels, footwears, tents, and sleeping bags and methods for making the fabrics.

BACKGROUND

Moisture vapor- and air-permeable metallized polyethylene plexifilamentary film-fibril sheets have been used as house wraps to increase insulation of buildings. However, those sheets are not suitable for garment due to poor hand feel, poor resistance to creases, and poor durability for washing.

SUMMARY

Described herein are breathable composite fabrics for use in apparels, footwears, tents, and sleeping bags that are comfortable to human use and durable to wash cycles.

In one aspect, a membrane includes a polymer layer and nano/micro metal particles embedded in the polymer layer. The polymer layer includes polyurethane. The nano/micro metal particles are about 10-50 wt % inclusive of the membrane.

In some embodiments, an emissivity of the membrane is in the range of 0.39-0.58 inclusive at a wavelength of 9.5 micrometers.

In some embodiments, the membrane has a thickness of 0.015 to 0.025 mm inclusive.

In some embodiments, the nano/micro metal particles comprises nano/micro Al particles.

In another aspect, a composite fabric includes an lining layer and a metallized membrane disposed on the lining layer. The metallized membrane includes a polymer layer and nano/micro metal particles embedded in the polymer layer. The polymer layer includes polyurethane. The nano/micro metal particles are about 10-50 wt % inclusive of the membrane. The lining layer is connected to the metallized membrane via point contacts.

In some embodiments, each of the lining layer and the metallized membrane has a moisture vapor transmission rate of at least 500 $g/m^2/24$ hr.

In some embodiments, the lining layer has a thickness of at least 60 micrometers.

In some embodiments, the lining layer includes a material selected from one or more of polyester, nylon, elastane, polyurethane, polyolefin, polylactic acid, or polytetrafluoroethylene (PTFE).

In some embodiments, the composite fabric has a moisture vapor transmission rate (MVTR) at least 35% of one of the lining layer or the metallized membrane.

In some embodiments, the point contacts include an adhesive, melted metalized membrane, and/or melted lining layer.

In another aspect, a composite fabric includes an inner layer, a metallized membrane disposed on the inner layer, and an outer layer disposed on the metallized membrane. The metallized membrane includes a polymer layer and nano/micro metal particles embedded in the polymer layer. The polymer layer includes polyurethane. The nano/micro metal particles are about 10-50 wt % inclusive of the membrane. The inner layer is coupled to the metallized membrane via first point contacts, and the outer layer is coupled to the metallized membrane via second point contacts.

In some embodiments, each of the inner layer, the metallized membrane, and the outer layer has a moisture vapor transmission rate of at least 500 $g/m^2/24$ hr.

In some embodiments, the inner layer has a thermal conductivity at most 0.6 W/m-K. The inner layer may include one of a woven fabric, a knit fabric, or a non-woven fabric. The inner layer may include a synthetic material or a natural material. In some embodiments, the synthetic material is selected from one or more of polyester, nylon, elastane, polyurethane, polyethylene, polypropylene, polylactic acid, or polytetrafluoroethylene.

In some embodiments, the composite fabric has a moisture vapor transmission rate at least 70% of each of the inner layer, the metallized membrane, and the outer layer. In some embodiments, the first and second point contacts are configured in a dot matrix. In some embodiments, the first and second point contacts include an adhesive. In some embodiments, the first point contacts include melted outer layer, melted inner layer, and/or melted metalized membrane. In some embodiments, the first point contacts or the second point contacts are formed by sewing or quilting.

In some embodiments, the metallized membrane has a moisture vapor transmission rate of at least 800 $g/m^2/24$ hr. In some embodiments, a combined emissivity of the metallized membrane and the outer layer is at most 0.85 at a wavelength of 9.5 micrometers.

In another aspect, an apparatus includes one of the above composite fabrics. The apparatus may be one of an apparel, a footwear, a tent, or a sleeping bag.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to a metalized membrane and breathable composite fabrics for use in apparels and footwears. In some embodiments, the membrane includes a polymer layer and nano/micro metal particles embedded in the polymer layer. The polymer layer includes polyurethane. The nano/micro metal particles are about 10-50 wt % inclusive of the membrane. An emissivity of the membrane is in the range of 0.39-0.58 inclusive at a wavelength of 9.5 micrometers. The membrane has a thickness of 0.015 to 0.025 mm inclusive. The nano/micro metal particles comprises nano/micro Al or other suitable metal or alloy particles.

Figure 1:
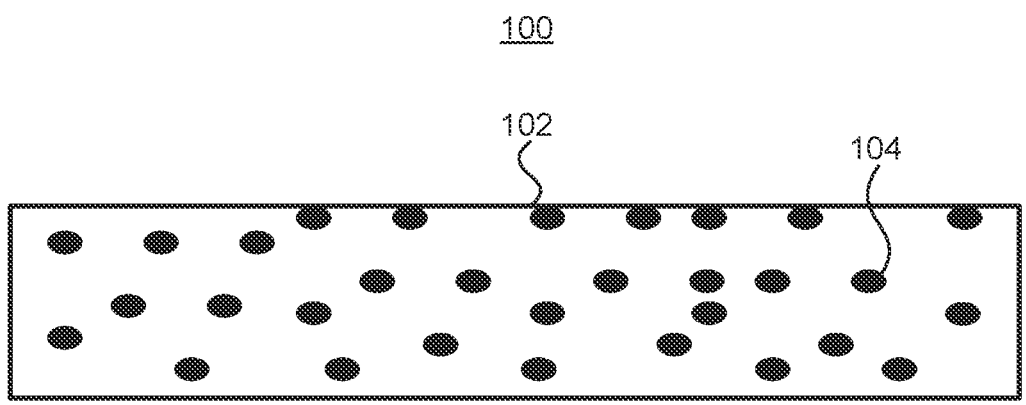
FIG. 1 depicts a metallized membrane according to one example embodiment.

Embodiments will now be explained with accompanying figures. Reference is first made to FIG. 1. FIG. 1 depicts a metallized membrane 100 according to one example embodiment. The metallized membrane 100 includes a polymer layer 102 and nano/micro metal particles 104 embedded in the polymer layer 102. The polymer layer 102 includes a material selected from one or more of polyurethane, thermoplastic polyurethane, polyester, polyamide, ePTFE membrane, etc. The nano/micro metal particles 104 comprises nano/micro Al or other suitable metal or alloy particles. For example, the nano/micro metal particles 104 have a size from 2 nm to 10 μm, from 10 nm to 1000 nm, from 50 nm to 1000 nm, from 100 nm to 1000 nm, from 250 nm to 1000 nm, from 500 nm to 1000 nm, from 500 nm to 1 μm, from 500 nm to 2 μm, from 500 nm to 5 μm, from 500 nm to 10 μm, from 1 μm to 5 μm, from 1 μm to 10 μm, or from 5 μm to 10 μm. A of the metallized membrane 100 is in the range of 0.35-0.60 inclusive at a wavelength of 9.5 micrometers determined by, for example, a thermal camera. The metallized membrane 100 has a thickness of 0.015 to 0.025 mm inclusive.

The metallized membrane 100 is provided as a breathable radiant barrier for insulation purposes. For those purposes, the metallized membrane 100 is configured to have low emissivity and high breathability. In some cases, the metallized membrane 100 is water proof. The metallized membrane 100 may be configured to be a breathable IR reflective layer to enhance thermal insulation through radiation reflection.

In some embodiments, the metallized membrane 100 has a moisture vapor transmission rate of at least 500 $g/m^2/24$ hr. In some embodiments, to provide further breathability, the metallized membrane 100 may have a moisture vapor transmission rate of at least 800 $g/m^2/24$ hr, at least 1000 $g/m^2/24$ hr, at least 1500 $g/m^2/24$ hr, at least 2000 $g/m^2/24$ hr, or at least 2500 $g/m^2/24$ hr, or between any two of the above numbers, inclusive.

In some embodiments, the polymer layer 102 includes polyethylene, which has a lower melting point than many conventional fabric materials so that it can produce a flat surface through calendaring at a lower temperature. The structure of the metallized membrane 100 may be configured to maximize the thermal radiation to be reflected back to the body because minimal heat is consumed to warm up the metallized membrane 100 due to absorption.

In some embodiments, to provide a suitable emissivity for the metallized membrane 100, the nano/micro metal particles is added to the polymer layer 102 such that they are about 10, 15, 20, 25, 30, 35, 40, 45 or 50 wt % of the metallized membrane 100, or between any two of the above numbers.

In some embodiments, the metallized membrane 100 can be made by mixing nano/micro metal particles with a melt polymer to form a mixture. The mixture is then applied to a release paper to be dried at 60-150° C. Once the mixture is dried to become a membrane, the membrane is removed from the release paper.

Figure 2:
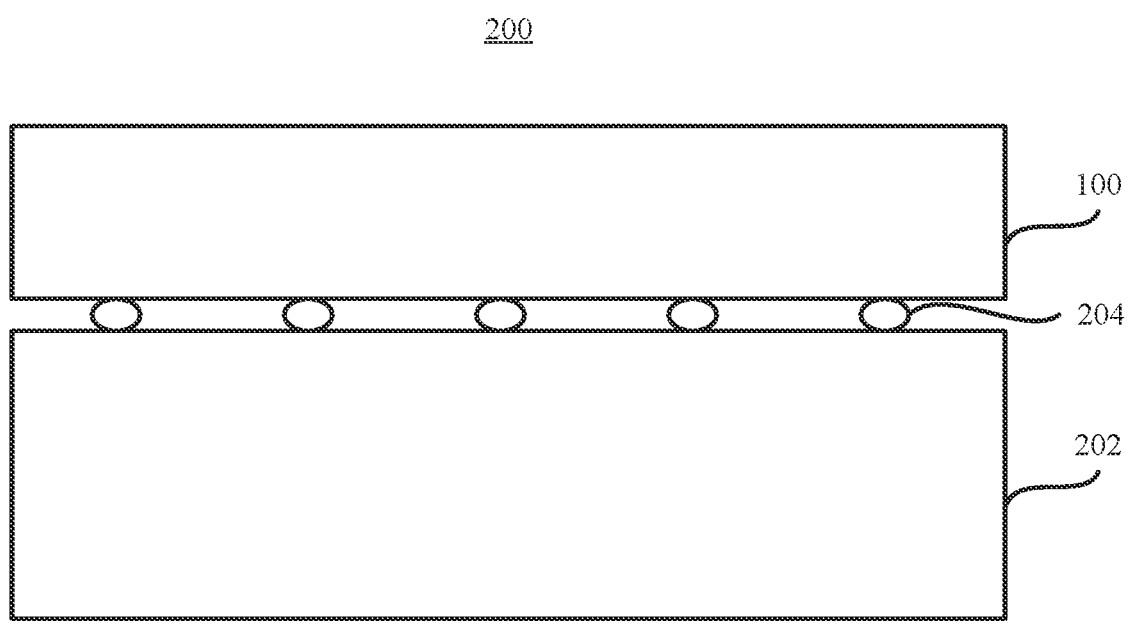
FIG. 2 is a schematic diagram depicting a breathable composite fabric, according to one example embodiment.

FIG. 2 is a schematic diagram depicting a breathable composite fabric 200 according to one example embodiment. The breathable composite fabric 200 includes a lining layer 202 and the metallized membrane 100 (as depicted in FIG. 1) disposed on the lining layer 202. The lining layer 202 and the metallized membrane 100 are connected to each other via point contacts 204.

The lining layer 202 is configured to add high breathability to the breathable composite fabric 200 to make apparels and footwears that are made therefrom more comfortable to wear. In some embodiments, the lining layer 202 has a moisture vapor transmission rate of at least 500 $g/m^2/24$ hr, at least 750 $g/m^2/24$ hr, at least 1000 $g/m^2/24$ hr, or at least 1500 $g/m^2/24$ hr, or between any two of the above numbers, inclusive. Including the lining layer 202 in the breathable composite fabric 200 also provides soft touch feeling to human body. In some embodiments, the lining layer 202 has a thickness of at least 60 micrometers to endure the wear and tear during its useful life time. Depending on where the breathable composite fabric 200 is applied to, the thickness of the lining layer 202 may vary. For example, the thickness of the lining layer 202 may be from about 60 micrometers to about 2400 micrometers, from about 60 micrometers to about 1500 micrometers, from about 60 micrometers to about 1000 micrometers, from about 60 micrometers to about 750 micrometers, or from about 60 micrometers to about 500 micrometers.

In some embodiments, the lining layer 202 includes one of a woven fabric, a knit fabric, or a non-woven fabric. In some embodiments, the lining layer 202 includes a synthetic material or a natural material. For example, the synthetic material for the lining layer 202 is selected from a group comprising polyester, polyamide, polyurethane, polyolefin, and polylactic acid. Further, the natural material for the lining layer 202 may include cotton, wool, silk, and other natural materials.

In some embodiments, the lining layer 202 has a tensile strength at least 45 N/2.54 cm under ASTM (American Society of Testing Materials) D5035 test conditions, a tear strength at least 9N under ASTM 2261 test conditions, and a Mullen burst at least 350 kPa under ASTM D774 test conditions.

The lining layer 102 and the metallized membrane 100 are connected with each other via a plurality of point contacts 204. In some embodiments, the metallized membrane 100 can be adhered to the lining fabric through adhesives, such as water-based adhesives, solvent-based adhesives, heat-activated adhesives, or pressure-activated adhesives. The adhesives are disposed on one or both of the lining layer 102 and the metallized membrane 100 to adhere them together. The adhesive is applied in a way that does not significantly reduce the breathability of the breathable composite fabric 200. For example, this can be achieved through applying the adhesives as point contacts 204 in a dot matrix instead of a monolithic film.

In some embodiments, the lining layer 202 and the metallized membrane 100 may be combined through ultrasonic or laser welding. The metallized membrane 100 may also be connected to the underlying lining layer 102 by heating the contact points 204 to above the melting point of the polymer layer 102 and/or the lining layer 202 under pressure. For example, a portion of the polymer layer 102 may be melted to form the point contacts 204 to connect to the lining layer 202. Or a portion of the lining layer 202 may be melted to form the point contacts 204 to connect to the metallized membrane 100. In some embodiments, both a portion of the lining layer 202 and a portion of the metallized membrane 100 may be melted to form the point contacts 204 between the lining layer 202 and the metallized membrane 100. In some embodiments, the point contacts 204 may be formed by sewing or quilting.

The contact points 204 are interposed between the lining layer 202 and the metallized membrane 100 in a manner to minimize the impact on breathability of composite fabric 200. For example, the point contacts 204 has an area covering less than 80% of the lining layer 202 (or the metallized membrane 100). For improved breathability, the point contacts 204 covers less than 50%, 40%, 30%, 20%, 10%, 5%, or 1% of the surface area of the lining layer 202 (or the metallized membrane 100). In some embodiments, the breathable composite fabric 200 does not reduce the breathability (MVTR) of its components by more than 35%. That is, the point contacts 204 are arranged such that the breathable composite fabric 200 has a breathability (MVTR) at least 35% of its components including the lining layer 202 and the metallized membrane 100.

The contact points 204 interposed between the lining layer 202 and the metallized membrane 100 may be arranged in a dot matrix of any form. A density of the contact points 204 may be uniform across the entire breathable composite fabric 200. In some embodiments, the density of the contact points 204 may vary from one to another region. For example, the density of the contact points 204 may be increased at areas where heavy wear and tear are expected.

Figure 3:
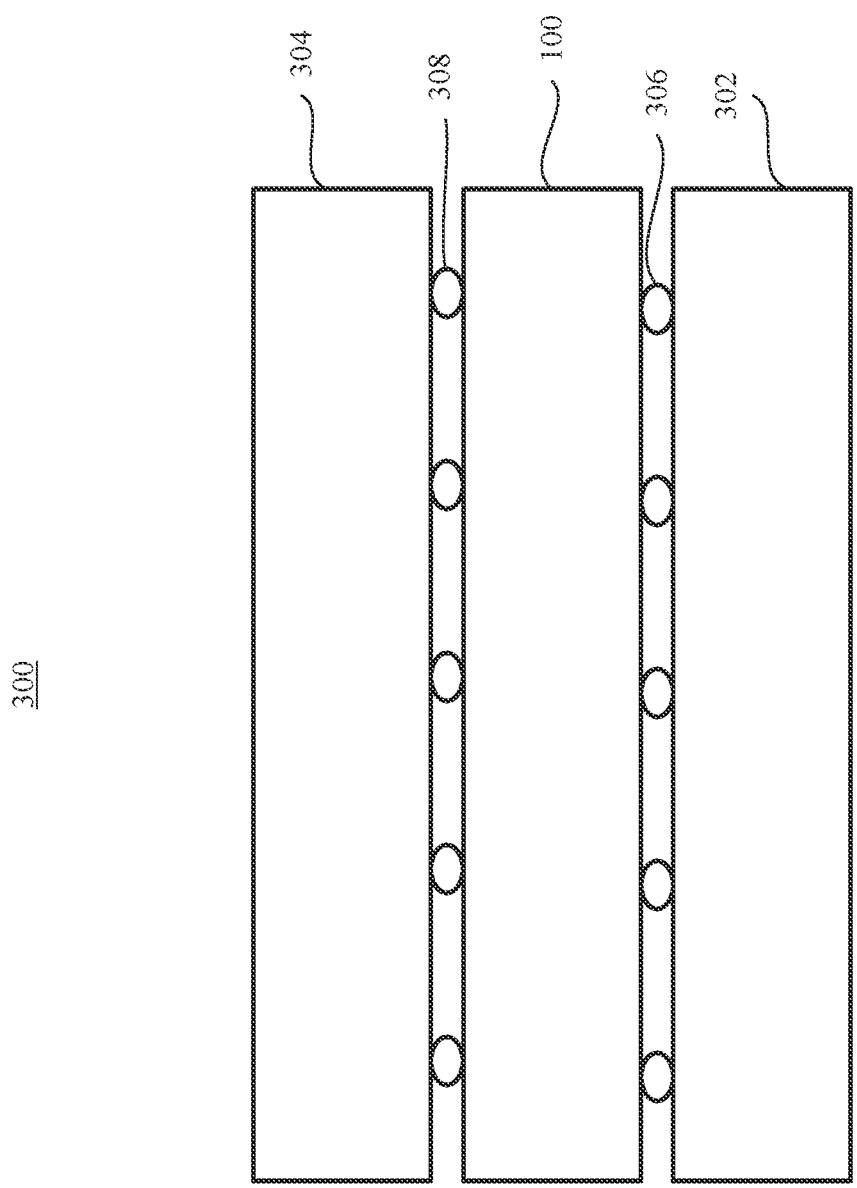
FIG. 3 is a schematic diagram depicting another breathable composite fabric, according to one example embodiment.

FIG. 3 is a schematic diagram depicting a breathable composite fabric 300 according to one example embodiment. The fabric 300 includes an inner layer 302, a metallized membrane 100 (as depicted in FIG. 1) disposed on the inner layer 302, and an outer layer 304 disposed on the metallized membrane 100. The inner layer 302 and the metallized membrane 100 are coupled to each other via first point contacts 306. The first point contacts 306 may be arranged in a dot matrix. The outer layer 304 and the metallized membrane 100 are coupled to each other via second point contacts 308. The second point contacts 308 may be arranged in a dot matrix.

The inner layer 302 is configured to add high breathability to the breathable composite fabrics 300 to make apparels and footwears that are more comfortable to wear. The inner layer 302 is also configured to be sufficiently strong, when combined with appropriate outer layer 304, to resist repeated dynamic/mechanical actions, such as wash cycles.

The inner layer 302 is similar to the lining layer 202 of FIG. 2, and the detail description for the inner layer 302 can be referred to the above in connection with the lining layer 202.

In some embodiments, the fabric 100 or 200 may have low thermal conductivity, typically not more than 0.1 W/m-K or at most 0.6 W/m-K, to minimize conductive heat loss.

The outer layer 304 is configured to be strong, when combined with the appropriate inner layer 302, to resist repeated dynamic/mechanical actions including wet conditions such as machine washing, and dry conditions such as rubbing, crocking, and machine drying.

In some embodiments, the outer layer 304 has a moisture vapor transmission rate of at least 500 g/m$^2$/24 hr. In some embodiments, to provide further breathability the inner layer 302 has a moisture vapor transmission rate of at least 750 g/m$^2$/24 hr, at least 1000 g/m$^2$/24 hr, or at least 1500 g/m$^2$/24 hr, or between any two of the above numbers, inclusive.

In some embodiments, the outer layer 304 includes one of a woven fabric, a knit fabric, a non-woven fabric, a film or a membrane. In some embodiments, the outer layer 304 includes a synthetic material and/or a natural material. For example, the synthetic material for outer layer 304 is selected from one or more of polyester, polyamide, polyurethane, polyolefin, polylactic acid, nylon, elastane, and PTFE. Further, the natural material for outer layer 304 may include cotton, wool, silk, linen, and other natural materials.

The inner layer 302 and the metallized membrane 100 are coupled with each other via a plurality of first point contacts 306. In some embodiments, the metallized membrane 100 can be adhered to the inner fabric through adhesives, such as water-based adhesives, solvent-based adhesives, heat-activated adhesives, or pressure-activated adhesives. The adhesives are disposed on one or both of the inner layer 304 and the metallized membrane 100 to adhere them together. The adhesives are applied in a way that does not significantly reduce the breathability of the breathable composite fabric 300. For example, this can be achieved through applying the adhesives as the first point contacts 306 in a dot matrix instead of a monolithic film.

In some embodiments, the inner layer 302 and the metallized membrane 100 may be combined through ultrasonic or laser welding. The metallized membrane 100 may also be coupled to the underlying inner layer 302 by heating the point contacts to above the melting point of the metallized membrane 100 and/or the inner layer 302. For example, a portion of the metallized membrane 100 may be melted to form the first point contacts 306 to connect to the inner layer 302. Or a portion of the inner layer 302 may be melted to form the first point contacts 306 to connect to the metallized membrane 100. In some embodiments, both a portion of the inner layer 302 and a portion of the metallized membrane 100 may be melted to form the first point contacts 306 between the inner layer 302 and the metallized membrane 100. In some embodiments, the first point contacts 306 may be formed by sewing or quilting.

The first point contacts 306 are interposed between the inner layer 302 and the metallized membrane 100 in a manner to minimize the impact on breathability of composite fabric 300. For example, the first point contacts 306 has an area covering less than 80% of the inner layer 302 (or the metallized membrane 100). For improved breathability, the first point contacts 112 covers less than 50%, 40%, 30%, 20%, 10%, 5%, or 1% of a surface area of the inner layer 302 (or the metallized membrane 100).

The first point contacts 306 interposed between the inner layer 302 and the metallized membrane 100 may be arranged in a dot matrix of any form. A density of the first point contacts 306 may be uniform across the entire breathable composite fabric 300. In some embodiments, the density of the first point contacts 306 may vary from one to another region. For example, the density of first the point contacts 306 may be increased at areas where heavy wear and tear are expected.

The outer layer 304 and the metallized membrane 100 are coupled with each other via a plurality of second point contacts 308. In some embodiments, the metallized membrane 100 can be adhered to the outer layer 304 through adhesives, such as water-based adhesives, solvent-based adhesives, heat-activated adhesives, or pressure-activated adhesives. The adhesives are disposed on one or both of the outer layer 304 and the metallized membrane 100 to adhere them together. The adhesive is applied in a manner that does not significantly reduce the breathability of the breathable composite fabric 300. For example, this can be achieved through applying the adhesives as the second point contacts 308 in a dot matrix instead of a monolithic film.

In some embodiments, the outer layer 304 and the metallized membrane 100 may be combined through ultrasonic or laser welding. The metallized membrane 100 may also be coupled to the outer layer 304 by heating the point contacts to above the melting point of the metallized membrane 100 and/or the outer layer 304. For example, a portion of the metallized membrane 100 may be melted to form the second point contacts 308 to connect to the outer layer 304. Or a portion of the outer layer 304 may be melted to form the second point contacts 308 to connect to the metallized membrane 100. In some embodiments, both a portion of the outer layer 304 and a portion of the metallized membrane 100 may be melted to form the second point contacts 308 between the outer layer 304 and the metallized membrane 100. In some embodiments, the second point contacts 308 may be formed by sewing or quilting.

The second point contacts 308 are interposed between the outer layer 304 and the metallized membrane 100 in a manner to minimize the impact on breathability of fabric 300. For example, the second point contacts 308 has an area covering less than 80% of the outer layer 304 (or the metallized membrane 100). For improved breathability, the second point contacts 308 covers less than 50%, 40%, 30%, 20%, 10%, 5%, or 1% of a surface area of the outer layer 304 (or the metallized membrane 100).

The second point contacts 308 interposed between the outer layer 304 and the metallized membrane 100 may be arranged in a dot matrix of any form. A density of the second point contacts 308 may be uniform across the entire breathable composite fabric 300. In some embodiments, the density of the second point contacts 308 may vary from one to another region. For example, the density of the second point contacts 308 may be increased at areas where heavy wear and tear are expected.

In some embodiments, the breathable composite fabric 300 has breathability (MVTR) of at least 70% of its components including the inner layer 302, the metallized membrane 100, and the outer layer 304.

In some embodiments, when the point contacts 306, 308 are embodied with adhesive, the adhesive adds a weight fewer than 30 or 60 $g/m^2$.

Figure 4A:
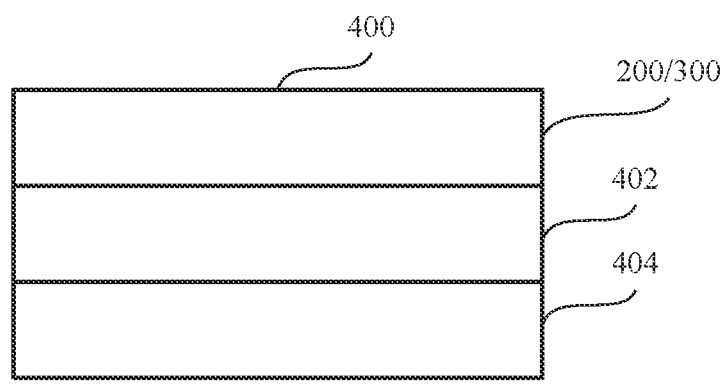
FIG. 4A-4C are schematic diagrams depicting laminates, according to example embodiments.
Figure 4B:
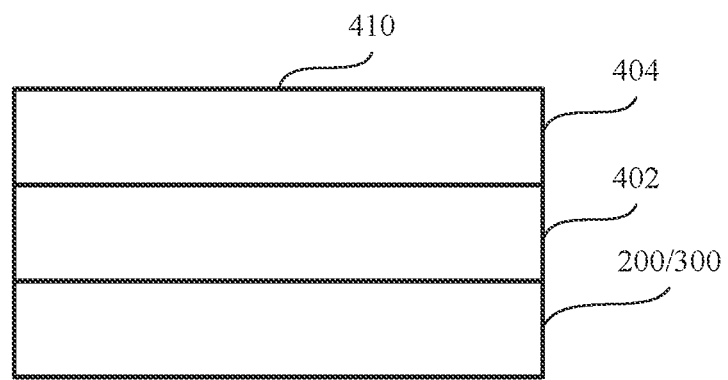
Figure 4C:
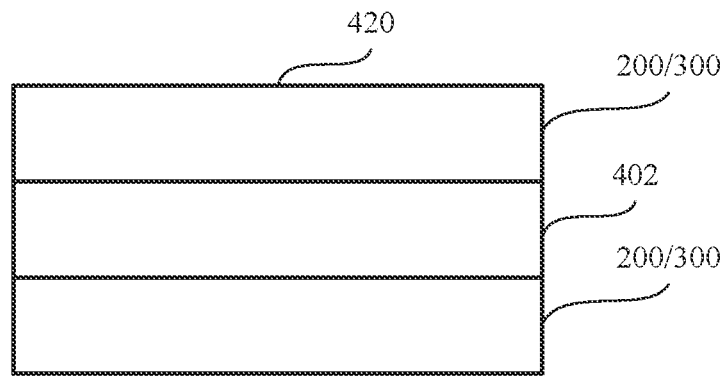

In some embodiments, the breathable composite fabric 200/300 may be used to make apparels, footwears, tents, sleeping bags, etc. In some embodiments, the breathable composite fabric 200/300 may be used with other materials to make apparels, footwears, tents, sleeping bags, etc. Example configurations are illustrated in FIGS. 4A-4C. FIG. 4A is a schematic diagram depicting a laminate 400 according to one example embodiment. The laminate 400 includes an outer layer made of the breathable composite fabric 200/300, an intermediate fibrous layer 402, and a single-layered fibric 404. In some embodiments, the intermediate fibrous layer 402 may include a fibrous insulation material, such as synthetic insulation, down, etc.

FIG. 4B is a schematic diagram depicting a laminate 410 according to one example embodiment. The laminate 410 includes an outer layer made of a single-layered fibric 404, an intermediate fibrous layer 402, and an inner layer made of the breathable composite fabric 200/300.

FIG. 4C is a schematic diagram depicting a laminate 420 according to one example embodiment. The laminate 420 includes an outer layer made of breathable composite fabric 200/300, an intermediate fibrous layer 402, and an inner layer made of the breathable composite fabric 200/300. It is to be understood that laminates 400, 410 and 420 are for illustration purpose only. Other structures using the breathable composite fabric 200/300 are contemplated.

In one aspect, a breathable composite fabric disclosed herein has high breathability, which makes it more comfortable to be worn than garment made from conventional fabrics.

In another aspect, a breathable composite fabric disclosed herein includes a more effective reflection layer using a metallized membrane. The metallized membrane includes a polymer layer made of polyurethane, which has a lower melting point than many conventional fabric material so that it can achieve flatter surface through calendaring at a lower temperature, e.g., less than 200° C. or about 135° C. The metallized membrane also includes nano/micro metal particles embedded in the polymer layer, where the nano/micro metal particles are about 10-50 wt % inclusive of the metallized membrane. The nano/micro metal particles provide sufficient reflection to keep heat to the body. In some embodiments, the emissivity of the metallized membrane is in the range of 0.35-0.60 inclusive at a wavelength of 9.5 micrometers. Further, the nano/micro metal particles are embedded in the polymer layer such that they are less susceptible to oxidation.

In another aspect, a breathable composite fabric disclosed herein provide better structural integrity and anti-oxidation ability than that of other meltspun non-woven materials, making the breathable composite fabric less susceptible to disintegration after washing.

In another aspect, a breathable composite fabric disclosed herein includes point contacts for adhering a metallized membrane to a lining layer or other protective layers, resulting in high breathability that is desirable for applications in apparels, footwears, tents, and sleeping bags, or other applications that need fabric materials.

This disclosure also provides an infrared-reflective breathable composite fabric that offers enhanced thermal insulation through infrared reflection. A three-layer composite where the middle layer is a breathable metallized layer mainly responsible for infrared reflection; while the inner and outer layers both provide strength and support so that the metallized layer can resist mechanical actions such as repeated rubbing and laundering. Further, the outer layer is chosen so that it not only protects the metallized membrane from oxidation, hence avoiding the reduction in reflectivity, but also not to block off the fabric's outward-facing emissivity. An emissivity of at most 0.8 is demonstrated in providing effective warming performance (measured by thermal camera) through IR reflection. The inner layer is also selected for giving a nice next-to-skin handfeel.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A composite fabric comprising:
   a lining layer; and
   a metallized membrane having a thickness of 0.015 to 0.025 mm inclusive and comprising a polymer layer that includes polyurethane and nano/micro metal particles embedded in the polymer layer, wherein the nano/micro metal particles are about 10-50 wt % inclusive of the metallized membrane and have a particle size from 500 nm to 5 µm, and wherein the metallized membrane has an emissivity in the range of 0.39-0.58 inclusive at a wavelength of 9.5 micrometers,
   wherein the lining layer is connected to the metallized membrane via point contacts, wherein the point contacts covers less than 50% of a surface of the metallized membrane facing the lining layer, and
   wherein each of the lining layer and the metallized membrane has a moisture vapor transmission rate of at least 500 g/m$^2$/24 hr, and wherein the composite fabric has a breathability (MVTR) at least 35% of the lining layer and the metallized membrane.

2. The composite fabric of claim 1, wherein the nano/micro metal particles have a particle size from 500 nm to 2 µm.

3. The composite fabric of claim 1, wherein the nano/micro metal particles have a particle size from 500 nm to 1 µm.

4. The composite fabric of claim 1, wherein the nano/micro metal particles comprises nano/micro Al particles.

5. The composite fabric of claim 1, wherein the point contacts covers less than 40% of the surface of the metallized membrane facing the lining layer.

6. The composite fabric of claim 1, wherein the lining layer has a thickness of at least 60 micrometers.

7. The composite fabric of claim 1, wherein the lining layer includes a material selected from one or more of polyester, nylon, elastane, polyurethane, polyolefin, polylactic acid, or polytetrafluoroethylene (PTFE).

8. The composite fabric of claim 5, wherein the point contacts covers less than 30% of the surface of the metallized membrane facing the lining layer.

9. The composite fabric according to claim 1, wherein the point contacts include an adhesive.

10. The composite fabric according to claim 1, wherein the point contacts include melted metallized membrane.

11. The composite fabric according to claim 1, wherein the point contacts include melted lining layer.

12. A composite fabric comprising:
    an inner layer;
    a metallized membrane having a thickness of 0.015 to 0.025 mm inclusive and comprising a polymer layer that includes polyurethane and nano/micro metal particles embedded in the polymer layer, wherein the nano/micro metal particles are about 10-50 wt % inclusive of the metallized membrane and have a particle size from 500 nm to 5 µm, and wherein the metallized membrane has an emissivity in the range of 0.39-0.58 inclusive at a wavelength of 9.5 micrometers, wherein the inner layer is coupled to the metallized membrane via first point contacts, wherein the first point contacts covers less than 50% of a surface of the metallized membrane facing the lining layer; and
    an outer layer disposed on the metallized membrane, wherein the outer layer is coupled to the metallized membrane via second point contacts, wherein the second point contacts covers less than 50% of a surface of the metallized membrane facing the outer layer,
    wherein each of the inner layer, the metallized membrane, and the outer layer has a moisture vapor transmission rate of at least 500 g/m$^2$/24 hr, and wherein the composite fabric has a breathability (MVTR) at least 70% of the lining layer, the metallized membrane, and the outer layer.

13. The composite fabric of claim 12, wherein the nano/micro metal particles have a particle size from 500 nm to 2 µm.

14. The composite fabric of claim 12, wherein the nano/micro metal particles have a particle size from 500 nm to 1 µm.

15. The composite fabric of claim 12, wherein the nano/micro metal particles comprises nano/micro Al particles.

16. The composite fabric of claim 12, wherein the first point contacts covers less than 10% of the surface of the metallized membrane facing the lining layer, and the second point contacts covers less than 40% of a surface of the metallized membrane facing the outer layer.

17. The composite fabric of claim 12, wherein the inner layer or the outer layer includes a material selected from one or more of polyester, nylon, elastane, polyurethane, polyolefin, polylactic acid, or polytetrafluoroethylene (PTFE).

18. The composite fabric of claim 12, wherein the first point contacts covers less than 30% of the surface of the metallized membrane facing the lining layer, and the second point contacts covers less than 30% of a surface of the metallized membrane facing the outer layer.

19. The composite fabric of claim 12, wherein the first and second point contacts include an adhesive.

20. The composite fabric of claim 12, wherein the first and second point contacts include melted inner layer or melted outer layer or melted metallized membrane.

* * * * *